US006446109B2

(12) United States Patent
Gupta

(10) Patent No.: US 6,446,109 B2
(45) Date of Patent: *Sep. 3, 2002

(54) APPLICATION COMPUTING ENVIRONMENT

(75) Inventor: Abhay K. Gupta, Milpitas, CA (US)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,868

(22) Filed: Jun. 29, 1998

(51) Int. Cl.$^7$ ............................................... G06F 15/16
(52) U.S. Cl. ..................................... 709/203; 345/853
(58) Field of Search ................................ 709/203, 202, 709/213, 214, 219, 224, 238, 302; 345/342, 349, 853

(56) References Cited

U.S. PATENT DOCUMENTS 5,790,789 A * 8/1998 Saurez ....................... 709/202

(List continued on next page.)

OTHER PUBLICATIONS

"Servlet Tutorial," Copyright 1997, Sun Microsystems, Inc.
"Introduction to Servlets," Copyright 1997, Sun Microsystems, Inc.
"The Java Servlet API," Copyright 1997, Sun Microsystems, Inc.
Fritzinger, J. Steven and Mueller, Marianne, "Java Security," Copyright 1997, Sun Microsystems, Inc.
Erdos, Marlena, Hartman, Bret, and Mueller, Marlena, "Security Reference Model For The Developer's Kit 1.0.2," Dated: Nov. 13, 1996.
"Secure Computing with Java. Now and the Future," Copyright 1995–98, Sun Microsystems, Inc.

Primary Examiner—Robert B. Harrell
Assistant Examiner—Bunjob Jaroenchonwanit
(74) Attorney, Agent, or Firm—Gunnison, McKay & Hodgson, L.L.P.; Philip J. McKay

(57) ABSTRACT

A computing environment that offers a level of decentralization wherein application server code resident on a remote application server can be distributed to a local server. The local server becomes a local application server for a client. A request for information by a client is serviced by the local application server. If the information is available on the local application server, the local application server satisfies the request using this information. If the information is not available locally, the local application server can access the remote application server to obtain the requested information. When the information is copied to the local application server, the local application server retains a copy of the information and forwards a copy to the client. Thus, subsequent requests can be satisfied without accessing the remote application server. Where the information cannot be transferred to the local application server, the local application server can establish a proxy to the remote application server that forwards a client request to the remote application server and a response from the remote application server to the client. The client communicates with the remote application server via the proxy on the local application server and is unaware of the remote application server. During a login process, the client establishes its identity which can be used for multiple applications and information requests. The local server generates a credential for the client that can be used to authorize access to any application server and/or service needed by the client.

19 Claims, 9 Drawing Sheets

U.S. PATENT DOCUMENTS

| | | | | |
|---|---|---|---|---|
| 5,826,024 A | * | 10/1998 | Higashimura et al. | 709/214 |
| 5,857,201 A | * | 1/1999 | Wright, Jr. et al. | 707/104 |
| 5,862,344 A | * | 1/1999 | Hart | 709/238 |
| 5,875,322 A | * | 2/1999 | House et al. | 395/561 |
| 5,878,218 A | * | 3/1999 | Maddalozzo, Jr. et al. | 709/213 |
| 5,881,230 A | * | 3/1999 | Christensen et al. | 709/203 |
| 5,883,626 A | * | 3/1999 | Glaser | 345/342 |
| 5,889,520 A | * | 3/1999 | Glaser | 345/349 |
| 5,919,257 A | * | 7/1999 | Trostle | 713/200 |
| 5,922,045 A | * | 7/1999 | Hanson | 709/206 |
| 5,930,768 A | * | 7/1999 | Hooban | 705/27 |
| 5,958,010 A | * | 9/1999 | Agarwal et al. | 709/224 |
| 5,960,200 A | * | 9/1999 | Eager et al. | 395/705 |
| 5,961,582 A | * | 10/1999 | Gaines | 709/1 |
| 5,987,454 A | * | 11/1999 | Hobbs | 707/4 |
| 5,987,608 A | * | 11/1999 | Roskind | 713/200 |
| 6,012,067 A | * | 1/2000 | Sarkar | 707/103 |
| 6,012,083 A | * | 1/2000 | Savitzky et al. | 709/202 |
| 6,025,474 A | * | 2/2000 | Carter et al. | 711/202 |
| 6,061,738 A | * | 5/2000 | Osaka et al. | 709/245 |
| 6,073,168 A | * | 6/2000 | Mighdol et al. | 709/217 |
| 6,112,228 A | * | 8/2000 | Earl et al. | 709/205 |
| 6,119,247 A | * | 9/2000 | House et al. | 714/38 |
| 6,202,200 B1 | * | 3/2001 | House et al. | 345/759 |

* cited by examiner

APPLICATION COMPUTING ENVIRONMENT

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, SPARC, Java, JavaBeans and all Java-based trademarks and logos are trademarks or registered trademarks of Sun Microsystems, Inc. in the United States and other countries.

BACKGROUND OF THE INVENTION

This invention relates to computing systems, and more particularly to the architecture and environment for computing and applications executing therein.

Computers are used to send and receive data using a transport mechanism or communications network. The Internet is one example of a transport mechanism and other examples include local area networks (LANs) and wide area networks (WANs). Using a network, a software application (a sender) that resides on one computer system can exchange information (e.g., corporate data or executable code) with a software application (a receiver) that resides on a remote computer system, for example. The exchange of information between computers typically occurs between a "server application" that provides information or services, and a "client application" that receives the provided information and services.

A problem with existing server applications is that they must be pre-configured to include the information that they are to provide to a client application. Further, issues such as transmission efficiency and security are raised when information is exchanged between computers. Transmission inefficiencies are especially apparent where information is communicated over a long distance and/or lower speed or bandwidth lines. Further, where transmission is being received by a computer system, security measures are typically used to ensure that the transmitted information (e.g., program code) does not corrupt the computer system. Unfortunately, security measures can restrict access to the computer system's resources which can hinder an application's efficiency and usability.

As will be discussed below, computing environments that use an application architecture initially developed for use with the Internet can be significantly affected by the type of medium used to form the Internet connection. The type of connection that a user has to the Internet can impact the speed at which :information is transmitted.

The application architecture that is typically used in the Internet environment is referred to as a three-tier application architecture, or three-tier architecture. The three-tier architecture was originally designed to allow a client to have access to data and applications. In this architecture, a client communicates requests to a server for data, software and services, for example. The three-tier architecture includes a database tier that includes a database server, an application tier that includes an application server and application logic (i.e., software application programs, functions, etc.), and a client tier. The application server responds to application requests (e.g., a request for a software applet, etc.) received from the client. The application server forwards data requests to the database server.

The number of tiers that are required for an application may vary. For example, a calculator application might only involve the client tier. That is, if the calculator application software and data are resident on the client, there is no need to access the application or database tiers. An application that makes use of persistent storage such as a word processing application and the documents created therein may involve both the client and the application tiers. An enterprise's application (e.g., an accounting or personnel) may involve all three tiers as data that is used by the application may be stored in a database.

FIG. 1 provides an overview of a three-tier architecture. Client tier 102 typically consists of a computer system that provides a graphic user interface (GUI) generated by browser 106. Browser 106 generates a display from a specification of GUI elements (e.g., a file containing input, form, and text elements defined using the Hypertext Markup Language (HTML) and/or by an applet (i.e., a program such as a program written using the Java programming language that runs when it is loaded by the browser).

Application server 110 is pre-configured to include those applications that are needed by its clients. In an effort to keep the size of the client minimal or "thin," applets that are executed in client tier 102 generally do not include any significant application logic. Application server 110 is pre-configured to include the application logic that is not included in client tier 102. The majority of an application's functionality is performed by the application logic that resides on and is managed by application server 110 in application tier 116. Database tier 118 contains the data that is accessed by the application logic in application tier 116. Database server 112 manages the data, its structure and the operations that can be performed on the data and/or its structure.

Application server 110 and database server 112 reside in production data center 108. Application server 110 can be pre-configured with applications such as a corporation's accounting, personnel and payroll applications, for example. Application server 110 manages requests directed to the applications that are stored on application server 110. Database server 112 manages the database(s) that manage data for applications. Database server 112 responds to request to access the accounting, personnel and payroll applications' data, for example.

Connection 104 is used to transfer the graphical user interface layer to client tier 102 and to transmit enterprise data between client tier 102 and production data center 108. The client tier can communicate with the application tier via a Remote Method Invocation (RMI) application programming interface (API) available from Sun Microsystems. The RMI API provides the ability to invoke methods, or software modules, that reside on another computer system. Parameters are packaged (or marshalled) and unpackaged (or unmarshalled) for transmittal to and from the client tier. Connection 114 represents the transmission of requests for data and the responses to such requests from applications that reside in application server 110.

In a typical computing environment, production data center 108 is located at a centralized site. In this way, applications can be centrally managed such that updates can be made and a standardized application base can be provided to users. However, an application's users can be spread across a wide geographical area. Thus, client tier 102 is not necessarily located at the same site or proximately connected to application server 110 (e.g., via a local area network, or LAN). Information may be transmitted, for example, via a wide area network (WAN) or the Internet that involve remote transmissions (e.g., overseas) and lower bandwidth communication technologies (e.g., modem) which can result in unacceptable transmission times. Transmission times are of concern since both data and application code may be transmitted between client tier 102 and application server 110 in the three-tier architecture.

The three-tier architecture can be used with various types of networks (e.g., Internet and intranet). Typically, client tier 102 communicates with production data center 108 via browser 106 which issues a request of application server 110. The client can request a resource that is identified by a uniform resource locator (URL) designation. For example, the URL can identify a page definition (e.g., an HTML document) that browser 106 uses to generate a display, or the URL can identify an applet (i.e., executable program code) which is run inside browse 106.

The information that is represented by a URL is downloaded to client tier 102. Thus, if a corporate application requires multiple downloads (e.g., multiple page definitions and/or applets) to run within client tier 102, the downloading process is inefficient when application server 110 is remote and/or slower transmission rates are used.

Security measures adopted for use with the application architecture limit the applications that have been developed according to this architecture. For example, an application's efficiency and/or usability can be impacted as a result of security measures. Further, there are issues of security concerning the transmission of information. From the perspective of client tier 102, for example, it is necessary to ensure that the information that is being received is "trusted." That is, it is important to ensure that client tier 102 is not corrupted by unauthorized software executing in client tier 102. Further, it is important to ensure that a client that attempts to access production data center 108 can be trusted with the corporation's data and applications.

Optimally, client tier 102 executes only those applets that have been received from a known and trusted source (e.g., production data center 108). A level of trust can be achieved between a client tier 102 and production data center 108 such that data and applets can be transmitted freely between client tier 102 and production data center 108. However, this paradigm is limiting and does not always occur in practice. Browser 106 may request an applet from a source other than production data center 108, for example. If an applet is allowed to execute unchecked in client tier 102, it introduces the potential for serious breaches of security and/or malicious access to the data and resources.

Security models or approaches have been adopted to limit the damage that may be caused by a breach of security and maliciousness. One such security approach, referred to as the sandbox security model, limits the access given to applets from an "untrusted" (i.e., unknown) source to only its namespace (e.g., operating system-assigned boundaries of a program such as the addressable memory).

An "untrusted" applet or software program is allowed to access only memory or other computer resources that are in its namespace. By limiting an "untrusted" applet to its own namespace, the applet can be prohibited from modifying areas of memory assigned to other applets or applications, for example.

Further, an applet may be prohibited from establishing a connection to (and/or downloading code from) a server (e.g., file or printer servers) other than the one from which it was retrieved. Client tier 102 may be forced to access another server via application server 110. To make a request of a file server, for example, client tier 102 sends the request to application server 110 which forwards the request to the file server. This is inefficient particularly when the file server adjacent to client tier 102.

Further, in the sandbox approach, printing is accomplished by displaying material to be printed in browser 106 and relying on the user to print the material using the print functionality available in browser 106.

The sandbox approach has clear disadvantages. An applet that is confined to its namespace cannot access information that is stored in a local file system. Further, confined applets cannot pool or share resources such as memory.

Another security approach uses signatures or other forms of certification to certify that an applet is from a known source. An "untrusted" applet can become a "trusted" applet, if its digital signature can be verified by, for example, client tier 102. Verification can be accomplished with digital signatures using a public key/private key encryption technique. The recipient of the information (e.g., client tier 102) uses the digital signature and a public key (a key generated from the private key and distributed to the public) to verify the digital signature thereby verifying the information.

Signed applet support is not provided by all clients. To support digitally signed applets, it is necessary for client tier 102 to include the ability to verify the signature. Many currently available browsers do not have such a capability.

In addition to the efficiency and security issues, in the three-tier model each application must log in to application server 110 separately. There is no ability to store user information (e.g., profile information) in client tier 102 or elsewhere so that it can be used for subsequent applications.

SUMMARY OF THE INVENTION

One or more embodiments of the invention comprise a computing environment that offers a level of decentralization wherein application code resident on a remote application server can be distributed to a local server, or local application server, that services a client. A local application server can be dynamically configured to serve its clients based on requests for application code and/or services. Further, application code that is downloaded to a client from the local application server can be trusted such that access to the local application server's resources can be given to the downloaded application code. Efficiencies can be achieved for the transmission of information.

Using embodiments of the invention, it is not necessary to pre-configure the local application server to satisfy a request of the server. The local application server can be configured dynamically (e.g., as needed) in response to requests. For example, there is no need to install application code or services on the local application server in anticipation of a request. If the local application server is not configured to handle a request, the local application server dynamically configures itself to satisfy the request.

A request for information, such as application code (e.g., an applet) by a client, can be serviced by the local application server with its existing configuration or a new configuration. If the local application server's configuration includes the requested application code, the local application server satisfies the request using its existing configuration. If the local application server's configuration does not include the requested application code, the local application server attempts to locate the requested application code (e.g., from another application server). When the requested application code is located, it is transferred to the local application server. The local application server retains a copy of the application code and forwards a copy to the client. Thus, if a subsequent request is made for the application code, it can be satisfied by the local application server (without accessing another application server).

The local application server can further be dynamically configured with services that can satisfy a client request. When a service request is received from the client, the local application server attempts to satisfy the request using a service that resides on the local application server. If the requested service is resident on the local application server, the local application server forwards the request to the service. There is no need to reconfigure the local application server.

If a request is for a service for which the local application server is not already configured, the local application server determines whether the service resides elsewhere (e.g., on another server). If the local application server finds the service, it determines whether the service can be acquired from its current location. If so, the service is copied to the local application server and is used to satisfy the client's request.

Where the requested service cannot be transferred to the local application server, the local application server establishes a proxy for the service. The proxy resides on the local application server and forwards the client request to the service that resides on the other application server. If a response is generated by the service, the response is sent to the proxy on the local application server and forwarded to the client. Thus, where a proxy is used, the client need not be aware of the service's actual location. The client is unaware that the requested service does not reside on the local application server.

In embodiments of the invention, the local application server includes an application locator, a service locator, a download service and none or more local services. The application and service locators are used by the local application server to locate application code and services (respectively) when a request is made that cannot be satisfied using the local application server's current configuration. Services that are downloaded to the local application server can be used by the local application server to satisfy a request.

The local application server can be configured with proxy services as needed. A proxy service acts as proxy for a service that resides elsewhere (e.g., on another server). A proxy service is used when, for example, a service cannot be transferred to the local application server. A service request is forwarded by the proxy service to the service. The service sends a response, if any, to the proxy service for forwarding to the requester.

The local application server can be configured with application software as needed. When, for example, a client requests application code, the local application server can obtain the application code, if it does not already have the requested application code. Application code that is acquired by the local application server is retained and can be used to satisfy a subsequent request for the application code, if any.

The local application server can be configured to include local services such as print, file, login or profile services that can be shared by multiple applications. Where the local application is configured to include local services, a client request for a local service is forwarded by the local application server to the local service.

One such local service allows a client to log in to the local application server. During a login process, the client establishes its identity which is stored on the local application server and can be used for multiple applications and information requests. The local server generates a credential for the client that can be used to authorize access to any application server and/or service requested by the client.

DETAILED DESCRIPTION OF THE INVENTION

An enterprise computing environment is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiment of Computer Execution Environment (Hardware)

Figure 2:
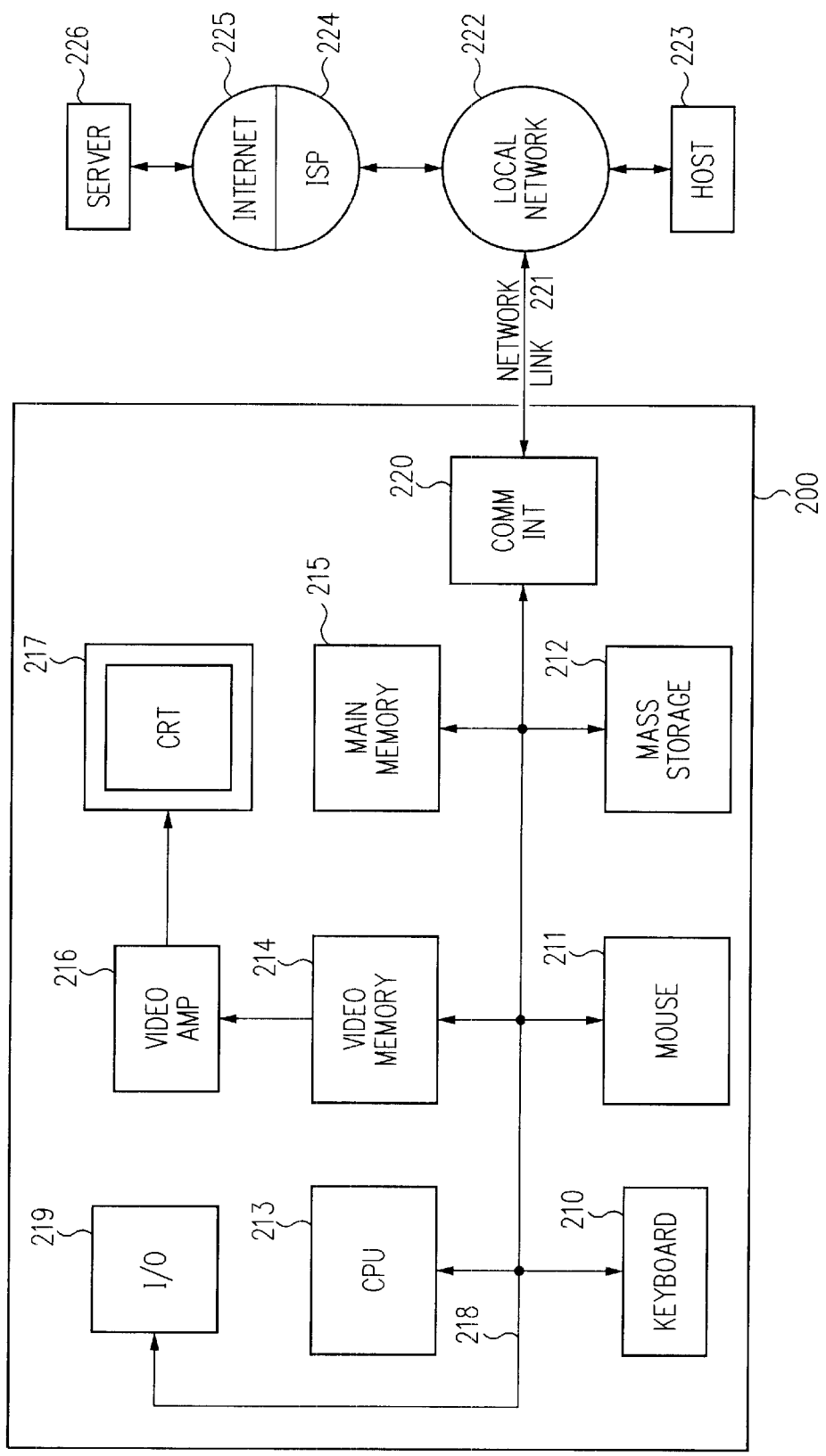
FIG. 2 is a block diagram of an embodiment of a computer system capable of providing a suitable execution environment for an embodiment of the invention.

An embodiment of the invention can be implemented as computer software in the form of computer readable program code executed on a general purpose computer such as computer 200 illustrated in FIG. 2. A keyboard 210 and mouse 211 are coupled to a bidirectional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the application computing environment described herein.

The received code may be executed by processor 213 as it is received, and/or stored in mass storage 212, or other non-volatile storage for later execution. In this manner, computer 200 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may be implemented in any type of computer system or programming or processing environment.

Four-Tier Architecture

Figure 1:
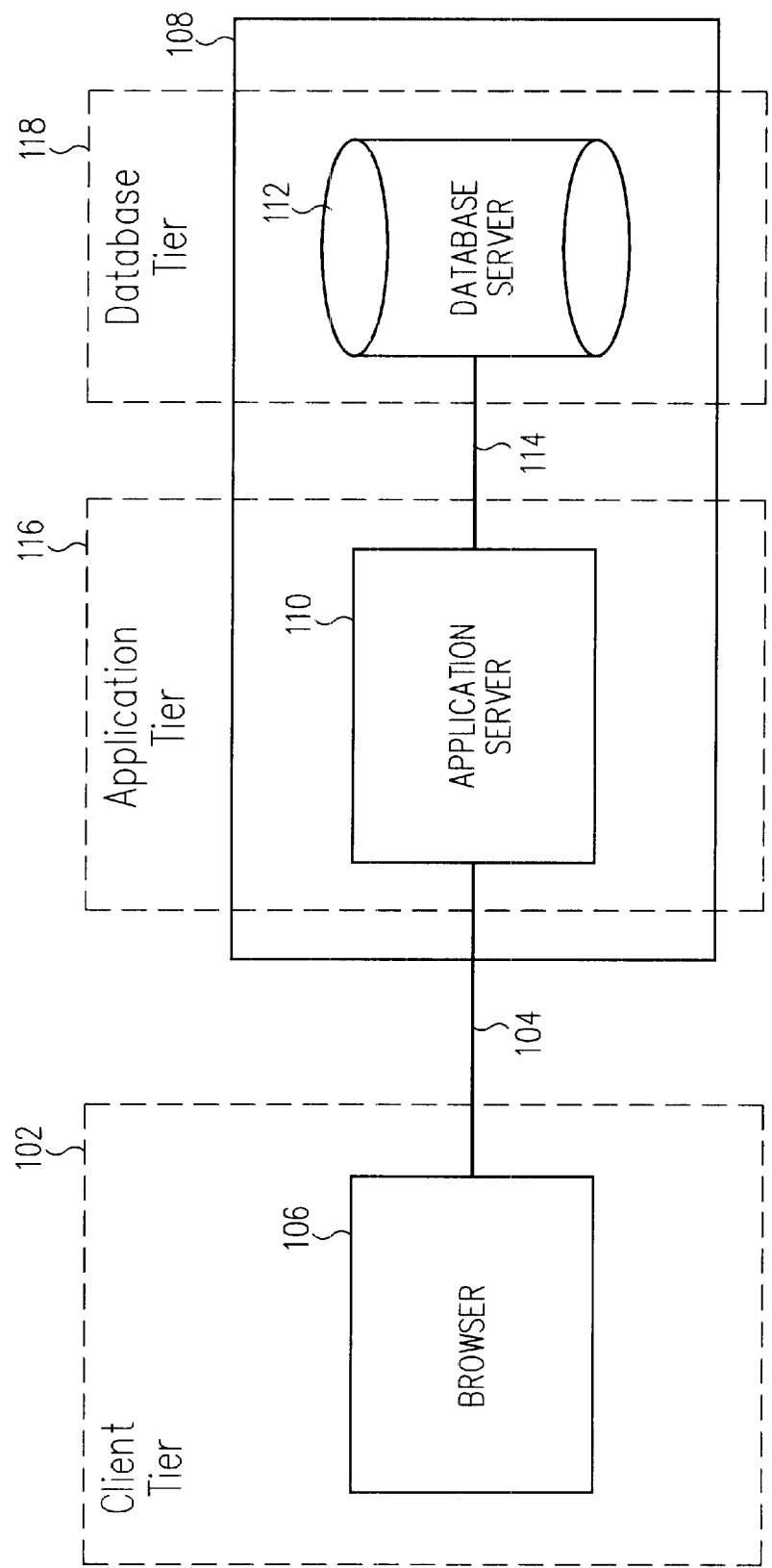
FIG. 1 provides a block diagram of a three-tier computing architecture.

One or more embodiments of the invention comprise a computing environment that offers a level of decentralization wherein information needed by a client can be cached at local application servers referred to as webtop servers. A webtop server can be for example, an instance of computer 200. Webtop servers also provide access to local and remote network services. Thus, a client accesses a webtop server instead of a remote server such as, for example, application server 110 that resides in production data center 108 of FIG. 1.

Figure 3:
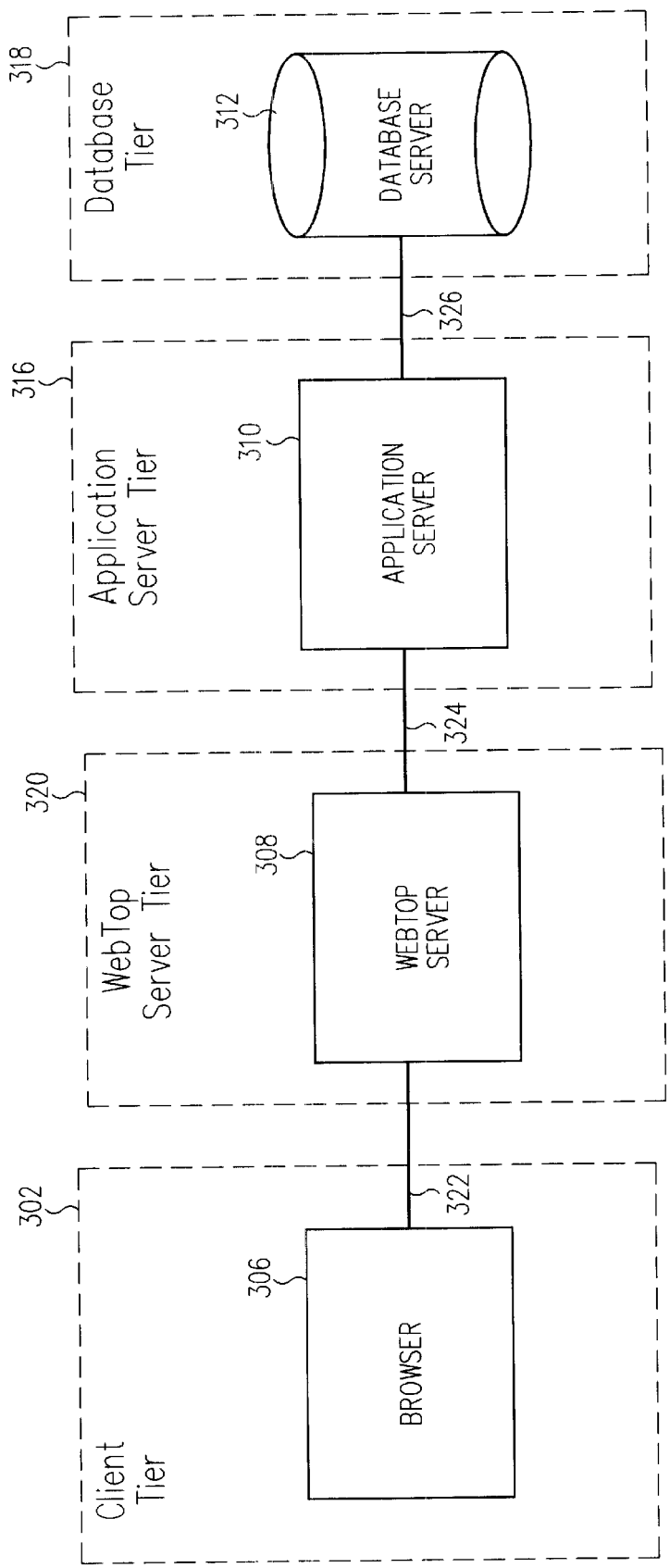
FIG. 3 is provides a block diagram of a four-tier architecture according to one or more embodiments of the invention.

In one or more embodiments of the invention, a webtop server is included in a four-tier application architecture (or four-tier architecture) as illustrated in FIG. 3. As in the three-tier architecture, client tier 302 provides a graphic user interface (GUI). The GUI can be written as a Java applet which runs from browser 306 or any Java enabled environment such as is provided on network computers. Browser 306 runs in client tier 302 which is comprised of an instance of computer 200 in an embodiment of the invention. The software program functionality or logic that is executed in client tier 302 can be minimized to limit the size of the programs that must be transmitted to client tier 302. This facilitates the deployment of client software to the clients that implement client tier 302.

Application server 310 resides in application server tier 316. Application server 310 manages requests for application logic and is responsible for database transaction handling with database server 312 that is in database tier 318. Database server 312 is responsible for storing application data in a persistent store such as a relational database (RDB) or an object-oriented database (OODB), for example. Database serve 312 responds to a request to access accounting, personnel and payroll applications' data, for example. In an embodiment of the invention, application server 310 and database server 312 are instances of computer 200.

Application server 310 and database server 312 can be resident in a production data center that is remote to a client in client tier 302. A client in client tier 302 communicates its requests to webtop server 308 in webtop server tier 320. Webtop server 308 can support multiple clients. Webtop server 308 caches applets and/or static data that are needed by a client. Further, webtop server 308 manages services which provide access to network resources need by a client (e.g., file system and printer resources).

In an embodiment of the invention, communication link 322 between a client in client tier 302 and webtop server 308 uses both the Hypertext Transmission Protocol (HTTP) and Remote Method Invocation (RMI). Similarly, communication link 324 between webtop server 308 and application server 310 uses both HTTP and RMI. It should be apparent, however, to one of ordinary skill in the art that other communication techniques and/or protocols can be used for communication links 322 and 324.

In one embodiment of the invention, communication link 326 between application server 310 and database server 312 uses a Java Database Connectivity (JDBC) Application Program Interface (API) that is available from Sun Microsystems, Inc. It should be apparent, however, to one of ordinary skill in the art that other database interfaces can be used for communication link 326.

Webtop server 308 caches data and applets for use by a client. When a client accesses an application for the first time, webtop server 308 retrieves and stores the program software from application server 310. Subsequent requests for the application software can be satisfied using the program software stored in webtop server 308. Where the program software is written as Java applets, webtop server 308 becomes the applet-host once the applets are transferred from application server 310. Thus, when the applet is executed on the client, the applet can communicate back to webtop server 308 as the host of that applet thereby satisfying the sandbox security paradigm.

Other program software that can be transmitted to webtop server 308 includes servlets. A servlet is a software program that is written in the Java programming language and runs on a server. A servlet can be invoked by a client via a name or a URL, for example. Servlets can be used to write application services that comprise application server tier 316, for example. An applet running on a client requests the handle for a servlet (e.g., a URL) from webtop server 308. If the servlet does not already reside at webtop server 308, webtop server 308 can obtain the servlet from application server 310 and send the service's handle to the client.

When a request is received by a servlet, the servlet can either satisfy the request locally or forward the request (or some portion of it) to another service. For example, file system and printing requests can be handled by services that reside on webtop server 308.

Figure 4A:
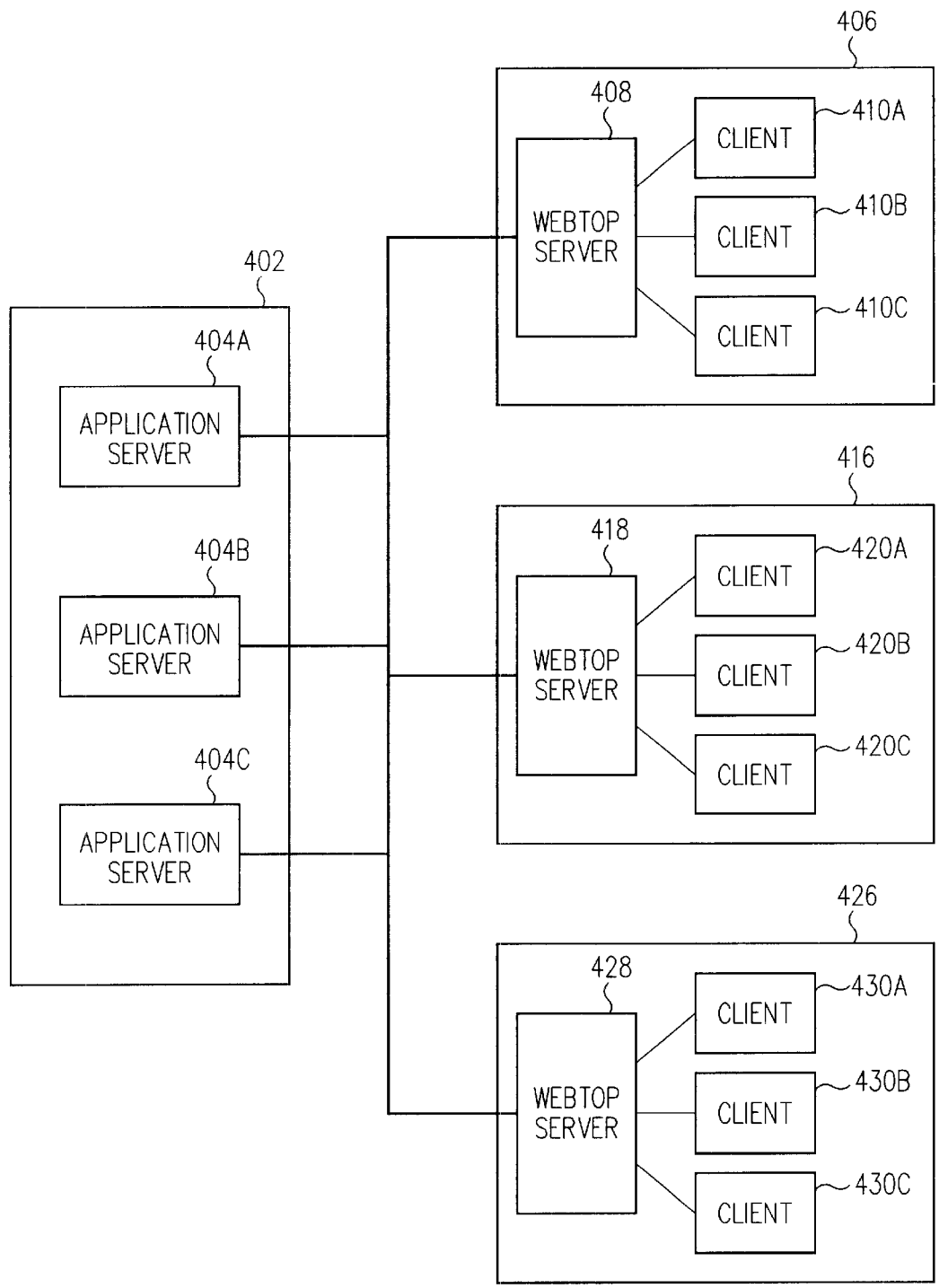
FIG. 4A illustrates a portion of a four-tier architecture with localized servers accessing application servers according to an embodiment of the invention.

FIG. 4A illustrates a portion of the four-tier architecture with localized servers accessing application servers according to an embodiment of the invention. In the four-tier architecture, the server with which a client interfaces can be located more conveniently and proximately located to the client. Application servers 404A–404C are resident in production data center 402 which can be located in a remote geographic location with regard to clients 410A–410C, 420A–420C and 430A–430C. It should be apparent that application servers 404A–404C can reside at the same or separate data centers, however.

Clients 410A–410C, 420A–420C and 430A–430C reside at sites 406, 416 and 426 (respectively). Using embodiments of the invention, it is unnecessary for sites 406, 416 and 426 and their clients 410A–410C, 420A–420C and 430A–430C to be proximately located with reference to production data center 402. Webtop servers; 408, 418 and 428 reside at sites 406, 416 and 426 (respectively) and are dynamically configured to handles requests such as those received from clients 410A–410C, 420A–420C and 430A–430C. Application software and services requested by clients 410A–410C, 420A–420C and 430A–430C can reside on webtop servers 408, 418 and 428 respectively.

Webtop server 408 can reside in the same building or campus as clients 410A–410C, for example. Similarly, webtop servers 418 and 428 can be proximately located to clients 420A–420C and 430A–430C, respectively. Clients 410A–410C, 420A–420C and 430A–430C interact with webtop servers 408, 418 and 428, respectively.

When a client requests application software or a service that is not resident on the webtop server, the webtop server can obtain the requested software or service from the production data center 402. When a client requests software that has already been cached on the webtop server, the software can be downloaded to the client without interfacing with production data center 402. A service that is resident on a webtop server can be used to satisfy a client's request for that service. Thus, the need to access application servers 404A–404C in production data center 402 is minimized. This is advantageous particularly when an inefficient mode of communication would otherwise need to be used between production data center 402 and clients 410A–410C, 420A–420C and 430A–430C.

Figure 4B:
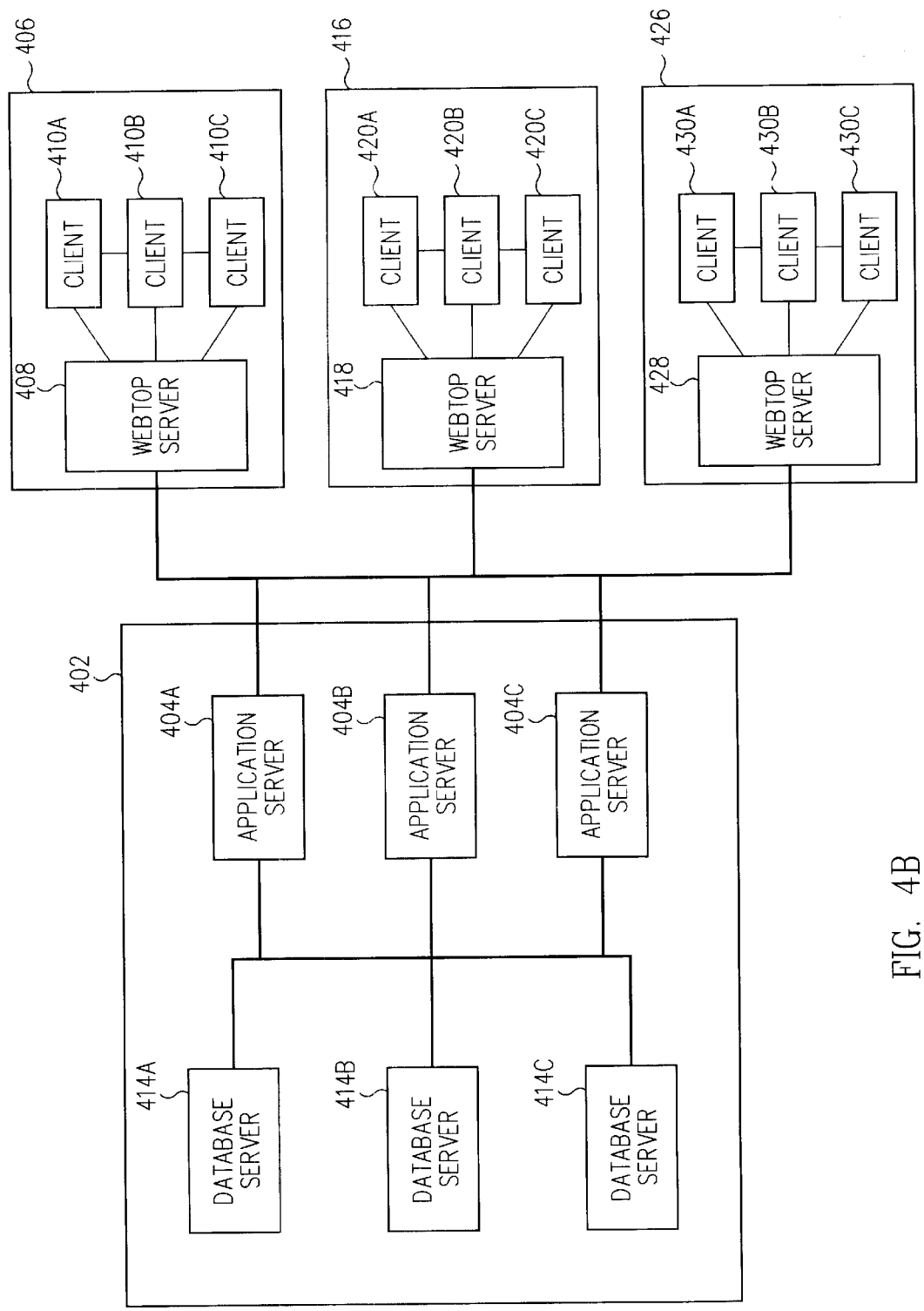
FIG. 4B illustrates a four-tier architecture with localized servers according to an embodiment of the invention.

FIG. 4B illustrates a four-tier architecture with localized servers according to an embodiment of the invention. Production data center 402 comprises application servers 404A–404C and database servers 414A–414C. While application servers 404A–404C and database servers 414A–414C are depicted as residing at the same production data center (i.e., production data center 402), it should be apparent that application servers 404A–404C and database servers 414A–414C can reside at separate instances of production data center 402.

Application servers 404A–404C forward requests for stored data (e.g., stored in a database) to database servers 414A–414C. A response received from one of database servers 414A–414C is forwarded by one of application servers 404A–404C. Thus, for example, a request for data initiated by client 410A residing at site 406 is forwarded to webtop server 408. Webtop server 408 forwards the request to one of the application servers at production center 402 (e.g., application server 404A). Application server 404A forwards the request to the appropriate database server (e.g., database server 414A). Database server 414A processes the request and responds with the requested data (or an error), for example. The response is forwarded to client 410A via application server 404A and webtop server 408.

Webtop Server

Figure 5:
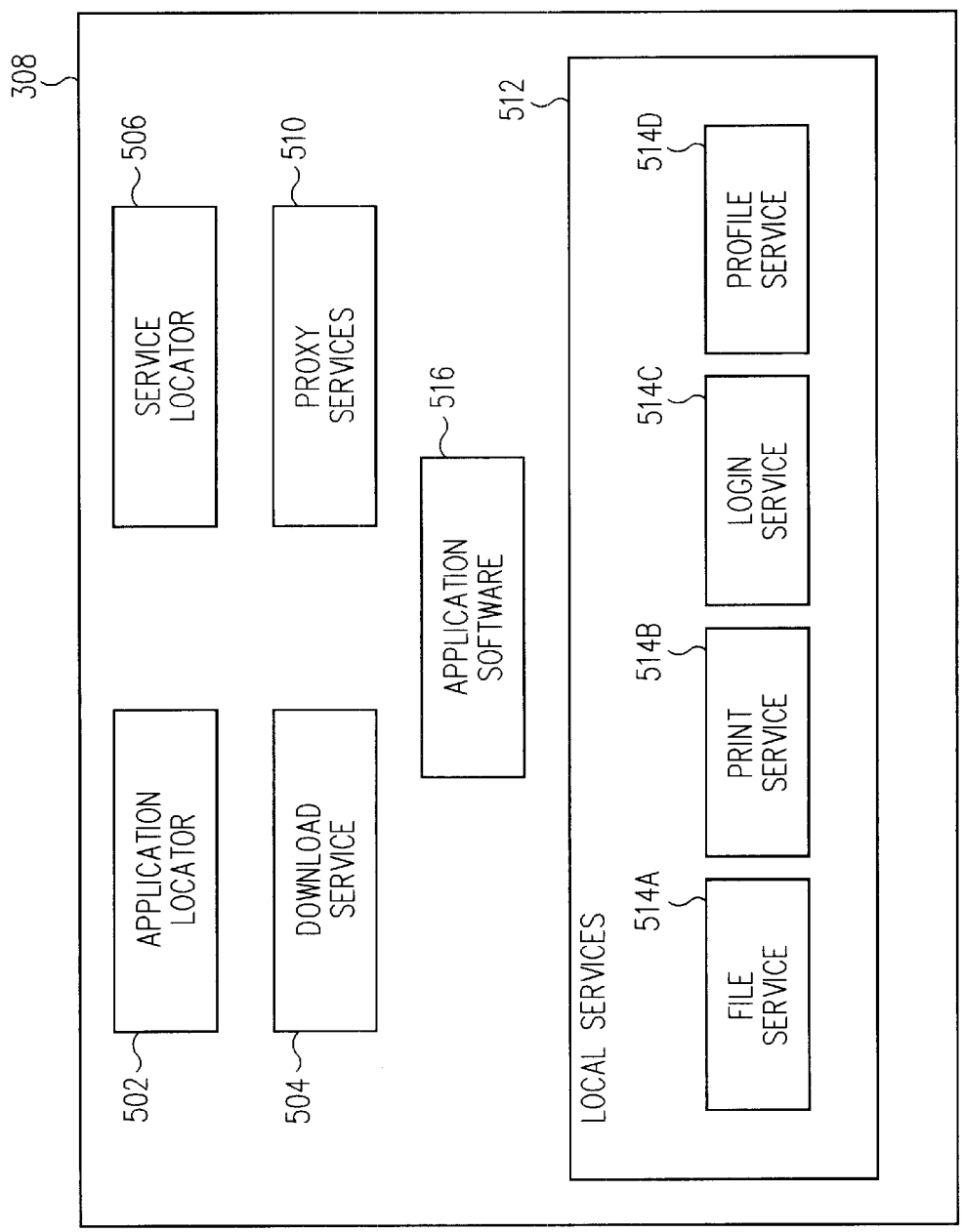
FIG. 5 provides an illustration of a webtop server according to an embodiment of the invention.

Webtop server 308 includes a service locator, cached applets and servlets, and local services. Examples of local services include file system, print, login and profile services which will be discussed in more detail below. FIG. 5 provides an illustration of a webtop server according to an embodiment of the invention.

Referring to FIG. 5, webtop server 308 includes application locator 502, download service 504, service locator 506, proxy services manager 510, local services 512 (e.g., file service 514A, print service 514B, login service 514C, and profile service 514D) and application software 516. Application software 516 comprises software that is cached at webtop server 308. The following provides a discussion of components of webtop server 308.

Login and Profile Services

In one or more embodiments of the invention, a login service (e.g., login service 514C) runs on webtop server 308 to log in a client and verify the client's login information (e.g., login identification and password). Login service 514C can further create a cookie to track the client session. A cookie is, for example, an item or items of information that is stored on the client and accessed by software that is running on the client (e.g., a browser). A cookie is typically stored as a text file, however, it can be retained using other storage mechanisms.

In one or more embodiments of the invention, login service 514C maintains, on webtop server 308, the client's profile that contains information about the client. Profile service 514D examines the profile to obtain information about the client. For example, profile service 514D can examine a client's profile to determine whether the client is able to connect to other systems on the network from an applet which is downloaded from webtop server 308. This occurs when, for example, the client trusts webtop server 308 as a trusted server. A client's profile can further include, for example, an identification of the protocols (e.g., RMI) supported by the client.

Profile service 514D can examine a client's profile information to identify and create a start page (e.g., an initial page that displays in client tier 302 once the client has successfully logged in. The initial screen is transmitted to client tier 302 for display by browser 306 in client tier 302.

In an embodiment of the invention, login service 514C is used to generate a credential that can be used on behalf of the client to verify the client to an application or network service. When the client wishes to access an application or network service, the credential is sent to the application or network server. The application or network server trusts the credential generated by login service 514C after verifying the signatures of login service 514C. The credential can be used to enable a client to enter a single login for all of the applications and/or network services that it accesses.

Login service 514C generates a credential certificate upon request of the client. It is not necessary for the credential certificate to contain the client's password. The credential certificate is sent by the applet to the network service or application. The network service or application verifies the signature(s) generated by login service 514C using the credential certificate.

Application Locator

Application locator 502 is used in one or more embodiments of the invention to locate application program software (e.g., applets). Application software that is not already cached on webtop server 308 is stored on an application server (e.g., application server 310) that is typically located in a central production center. Application locator 502 consults a directory to locate the application server that contains the requested application software. Once the applet is located, download service 504 acquires the application software for storage on webtop server 308.

The application software that is stored on webtop server 308 can be downloaded to client tier 302 from webtop server 308. Webtop server 308 becomes the host server for the application software that is downloaded to client tier 302. Thus, under the sandbox security model, the application software executing on the client can send requests to webtop server 308.

Application locator 502 can further verify that the application software that is cached on webtop server 308 is the current version of the software. The directory information for application locator 502 can contain versioning information that application locator 502 can examine to determine whether the cached version of the software is the most recent version of the application software. If a more recent version exists, download service 504 can access application server 310 to obtain the current version of the application software. Because webtop server 308 maintains the most recent version of the application software, the client receives the current version of the application software.

A broadcast message technique can be used as an alternative to webtop server 308 examining the directory to determine whether it has the most recent version of application software. For example, when an applet is changed, a broadcast message can be sent across the network. The broadcast message can be sent out to all instances of webtop server 308 or only those instances that have registered to receive such a message. When a broadcast message is received by webtop server 308, it can respond by obtaining the new version. Download service 504 can respond by acquiring the changed application software from the application server on which the newer version resides for storage on webtop server 308, for example.

Thus, application server 310 can notify webtop server 308 when a change occurs in application code. Alternatively, webtop server 308 can contact application server 310 to determine whether the application code has been updated. Application server 310 can keep track of all changes to application software. When contacted by webtop server 308, application server 310 examines its set of changes and respond to webtop server 308. If application server 310 indicates that application code has changed, webtop server 308 can request an updated copy of the application code.

To request application software, the client need only reference application locator 502 on webtop server 308 and identify the requested application software by name, for example. There is no need for the client to remember a URL for the requested application software. Application locator 502 accesses the directory to translate the name provided by the client into a identifier (e.g., a URL) for the application software.

Service Locator

Application software that is running on a client can request a service (e.g., file system or print services). When a service request is received by webtop server 308, service locator 506 is used in one or more embodiments of the invention to locate a local or network service to satisfy the request. It is not necessary for the application software to be aware of the location of the network or local service. Thus, a network or local service can be moved without impacting the applet code.

To illustrate, an applet (or other application software) running in client tier 302 submits a request for a service via communication link 322. The request is received by service locator 506 which proceeds to find the requested service. If the service can be transferred to webtop server 308, download service 504 acquires the service from the server on which it resides. If not, service locator 506 acquires a proxy on webtop server 308 that acts as a conduit for transmissions between the client and the requested service.

In one or more embodiments of the invention, services are written in the Java programming language and are referred to as servlets. Sun Microsystems, Inc.'s WebServer™, as well as other servers, support the use of server-side programs written in the Java programming language (i.e., servlets). A Java Servlet API is available from Sun Microsystems, Inc. that includes abstract classes that can be subclassed to create a servlet.

Where it is possible for an application software's request to be satisfied by more than one service, service locator 506 can choose based on each service's respective loads. Thus, service locator 506 can perform load balancing across the services. A discussion of load balancing is provided below.

Directory Service

Service locator 506 and application locator 502 locate a service (or services) and application code (respectively) when webtop server 308's current configuration cannot satisfy a request. In one or more embodiments of the invention, a directory service can be accessed, for example, to locate a service or an application's program code.

A directory service can be centrally located or distributed at various geographical areas. A distributed directory service can comprise entries for all geographical areas, or those for a particular area. A replication mechanism can be used to replicate entries to each of the distributed directory services such that each directory service comprises all entries, for example.

A directory service receives and processes locator requests. A directory service maintains a store of information that contains an entry for each service or application code that is registered with the directory service. This store is referred to herein as a directory. When a new service or application is installed, an entry is added to the directory by the directory service. Entries can also be deleted from the directory when, for example, a service or application is no longer available.

With respect to a service, a directory entry associates a service name with the location of the service. Similarly, a directory entry can identify an application's program code by its name. The location can be expressed in terms of a URL in one or more embodiments of the invention. Service locator 506 or application locator 502 queries the directory service using the name of the service or application (respectively). The directory service queries the directory for a service or application code with that name. The directory service returns the location of the service(s) or application code, or an error, if the directory does not contain an entry with the name.

Proxy Services

In some cases, a service cannot be transferred to webtop server 308. In this case, webtop server 308 can transfer a proxy for the service. A service may, for example, process secure information and must therefore be executed in a secure environment such as application server 310. The service's proxy forwards the client's request to the service that is running on application server 310.

If a proxy is copied to webtop server 308 instead of the service, webtop server 308 creates a handle for the proxy. The proxy's handle is forwarded to the client. The client is unaware that the handle is to a proxy and not the actual service. The client submits a request to the service via the service's proxy using the proxy's handle. When the request is received by webtop server 308, it is given to the service's proxy. The service's proxy forwards the request to the service.

If the service generates a response to the request that is to be transmitted back to the client via the proxy. The service sends the response to the proxy on webtop server 308. The proxy forwards the response to the client.

Figure 6:
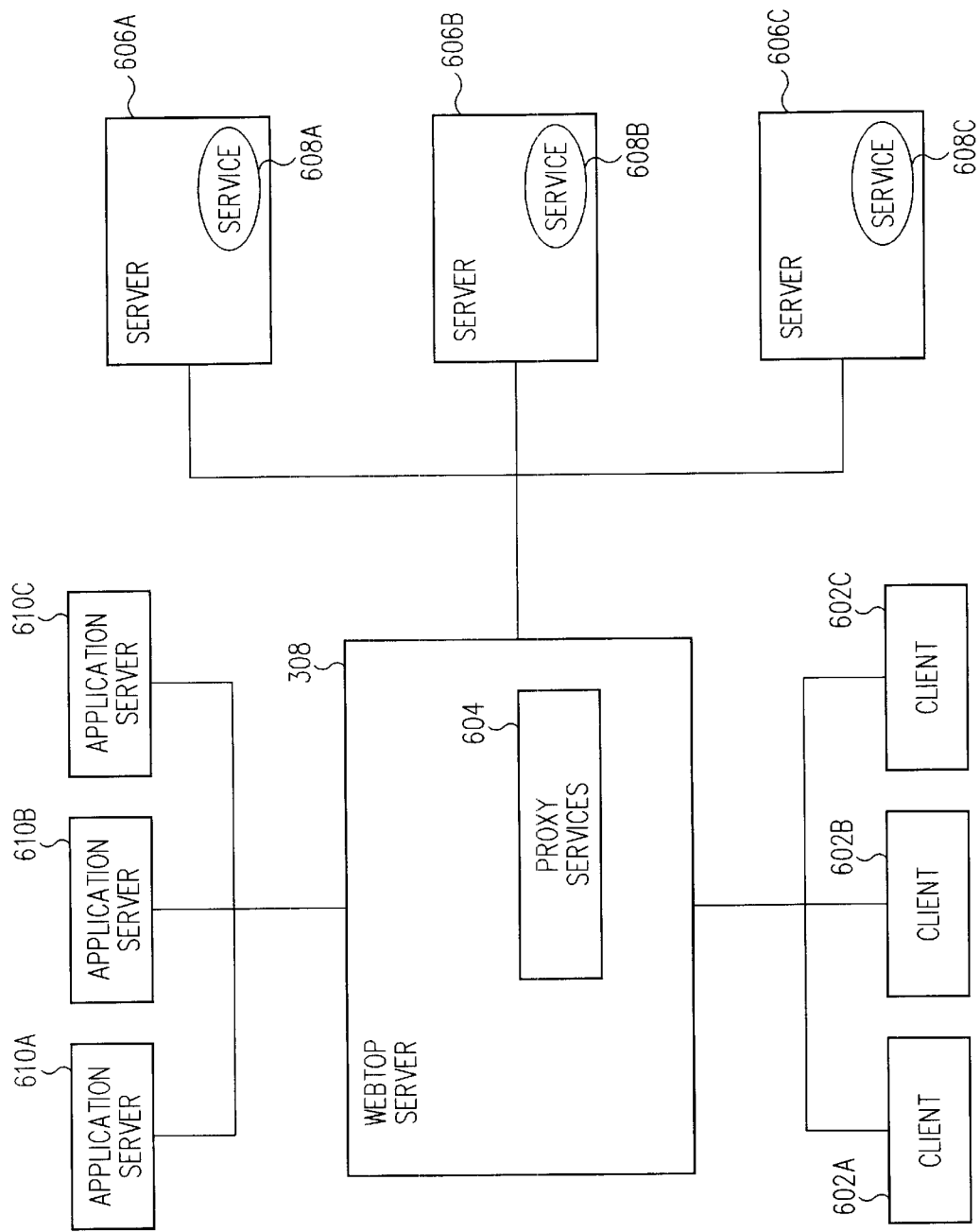
FIG. 6 illustrates the use of proxies for connecting multiple clients to multiple servers according to an embodiment of the invention.

FIG. 6 illustrates the use of proxies for connecting multiple clients to multiple servers according to an embodiment of the invention. Proxy services 604 of webtop server 308 comprises proxies that can act as a conduit for communications between multiple clients and multiple application servers. That is, for example, a proxy can connect clients 602A–602C and applications servers 610A–610C. Further, proxy services 604 can be used to connect clients to servers other than application servers 610A–610C. Thus, clients can use services that reside on different servers. Clients 602A–602C can access services on servers 606A–606C, for example.

A credential certificate generated by login service 514C can be sent to a network service (e.g., services 608A–608C). The network service trusts the credentials supplied by login service 514C after it verifies the signatures of login service 514C. The client need only enter a single login (i.e., with login service 514C) to access multiple applications and network services.

Local Services

Services that are resident on webtop server 308 are local services. For example, local services are those services that permanently reside on webtop server 308, or are copied to webtop server 308 in response to a request by the client. Referring to FIG. 5, login service 514C and profile service 514D are examples of services that typically reside permanently on webtop server 308. If these or other services are not resident on webtop server 308, they may be transferable to webtop server 308 as described herein. Other examples of local services are file service 514A and print service 514B.

A client forwards a request for a handle to a service to webtop server 308. If the service is local to webtop server 308, the handle is forwarded by webtop server 308 to client. The client can access the service using the handle.

Responses generated by a local service are forwarded by webtop server 308 to the client.

Load Balancing

Service locator 506 and proxy services 510 can perform load balancing according to an embodiment of the invention. Where service locator 506 is aware of more than one service that is capable of satisfying a service request, service locator 506 can balance the processing load between the services. For example, service locator 506 can select a service based on which of the services received the last request. That is, service locator 506 can assign requests to each of services in a sequential, cyclical manner (e.g., a round robin assignment) to balance the load across all of the services that are capable of satisfying the service request.

Similarly, proxy services 510 may be aware of multiple services that can satisfy a request. Proxy services 510 can act as the proxy for multiple services. Therefore, proxy services 510 can distribute service requests to the services for which it acts as a proxy to balance the request processing load. For example, proxy services 510 can assign service requests using a round robin technique.

Acquisition Process

Figure 7:
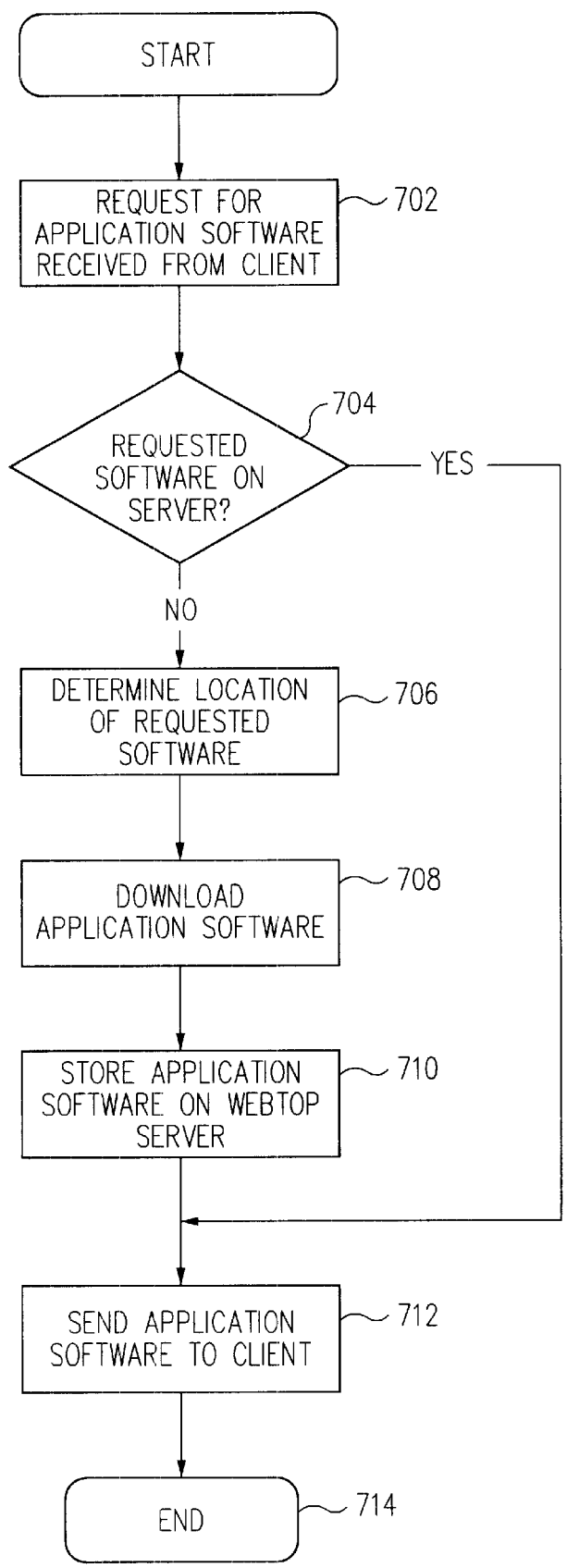
FIG. 7 provides a application software acquisition process according to an embodiment of the invention.
Figure 8:
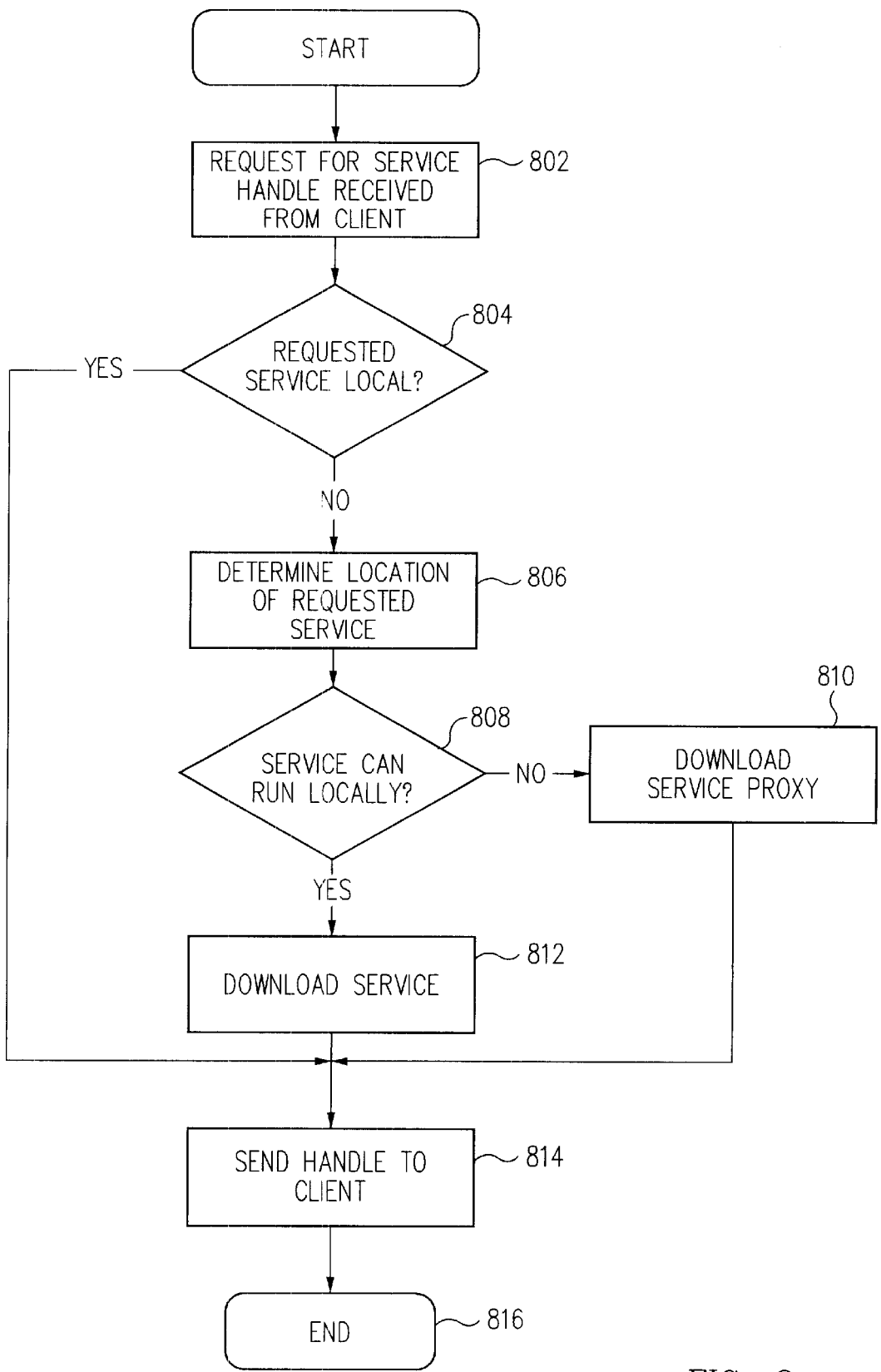
FIG. 8 provides a service acquisition process according to an embodiment of the invention.

Application software and services can reside on webtop server 308 for local access by a client. If the application software and/or services do not already reside on webtop server 308, they can be downloaded for use by the client. FIGS. 7 and 8 provide process flows for acquiring the application software and services, respectively, according to embodiments of the invention.

Referring to FIG. 7, a request for application software is received from the client at step 702. At step 704, webtop server 308 determines whether the software is cached on the server. If so, processing continues at step 712 to send the requested application software to the client and processing of the software request ends at step 714.

If the requested software does not reside on webtop server 308, processing continues at step 706 to determine the location of the software. Webtop server 308 consults an information base (e.g., database or other repository of information) that can reside at a local, regional or centralized site, for example, to determine the location of the requested software. In one embodiment of the invention, the client identifies the requested software by name, for example. It is not necessary for the client to know the exact location of the requested software. However, if the location is known by the client (e.g., in the form of a URL), the client can submit this information to webtop server 308.

Using the location information obtained for the requested software, webtop server 308 sends a request to the application server on which the requested software resides (application server 310). If necessary, webtop server 308 can provide a credential so that the request can be verified by the application server. At step 710, the application software that is transferred from the application server is cached on webtop server 308. At step 712, the requested application software is forwarded to the client and processing of the software request ends at step 714.

Similarly, the client can request a service (e.g., print or file service). If the service is local to webtop server 308, a handle for the service can be sent to the client. If the service is not local, webtop server 308 attempts to download the service for use locally by the client. If the service cannot be obtained or there is no gain (e.g., efficiency gain), webtop server 308 obtains a proxy for the service and a proxy handle is sent to the client. FIG. 8 provides a service acquisition process according to an embodiment of the invention.

At step 802, a request for a service handle is received from the client. At step 804, webtop server 308 determines whether the service is already local (or resident on webtop server 308). If so, processing continues at step 814 to return a handle for the service to the client and processing of the service request ends at step: 816.

If the service is not local to webtop server 308, processing continues at step 806 to determine the location of the requested service. Webtop server 308 consults an information base (e.g., database or other repository of information) that resides at a local, regional or centralized site, for example, to determine the location of the requested service.

At step 808, a determination is made whether the service can run locally on webtop server 308. If, for example, the service must run in a secure environment of another server, the service cannot be copied to webtop server 308. Further, if the service must interact with other services that cannot be copied to webtop server, there is little benefit to obtaining a copy of the service. In these cases, webtop server 308 does not download the service, but requests a proxy for the service at step 810. If webtop server 308 determines that the service is transferable, it requests a copy of the service at step 812.

At step 814, a handle to the service of the service's proxy is sent to the client. Processing of the service request ends at step 816.

Servlet Security

In one or more embodiments of the invention, a security model is implemented whereby an applet's status as trusted or untrusted indicates the degree of access to resources given to the applet. An untrusted applet is limited to its own namespace, for example. A trusted applet can have access to resources (e.g., memory) outside of its namespace. Since servlets (like applets) can be copied from trusted servers as well as untrusted servers, a security approach can be used to ensure that servlets cannot cause harm to computer resources.

In one embodiment of the invention, webtop server 308 limits the acquisition of servlets such that servlets are only obtained from trusted servers. A servlet that is obtained from a trusted server is considered to be a trusted servlet and may be given access outside the sandbox (e.g., outside of its own namespace).

In another embodiment of the invention, webtop server 308 allows servlets to be obtained from both trusted and untrusted servers. To verify an untrusted servlet, webtop server 308 can require that a servlet obtained from an untrusted server be signed with a signature of an authorized person. The signature is verified before the servlet is considered to be a trusted servlet. If a servlet is obtained from an untrusted server, it is considered to be untrusted unless it has a signature that has been verified. As with an untrusted applet, an untrusted servlet is limited, in its access, to its own namespace. That is, an untrusted servlet is run inside the sandbox.

Thus, an enterprise computing environment has been provided in conjunction with one or more specific embodiments. The invention is defined by the claims and their full scope of equivalents.

What is claimed is:

1. A multi-tiered network computing environment comprising:
   a database tier comprising at least one database server for servicing requests for stored data;
   an application server tier comprising at least one network application server, wherein said application server routes said requests for stored data to said database tier;
   a local webtop server tier coupled to said application server tier, said local webtop server tier serving as, host server tier for any application software requested by a client, said webtop server tier having at least one webtop server configured to maintain cache of application software and data received from said application server in response to previous requests for said application software and data, said at least one webtop server having an application locator configured to use a name of an application software specified by said client to locate, from a directory, one of said at least one network application server capable of providing said application software and downloading said application software if said application software is not in cache, said application locator verifying that said cache contains current version of application software; and
   a client tier comprising at least one of said client coupled to said local webtop server tier.

2. The computing environment of claim 1 wherein said webtop server further comprises a login service configured to accept login information from said client and verification of said client.

3. The computing environment of claim 2 wherein said login service is configured to generate a credential for use by said client to access multiple applications and services.

4. The computing environment of claim 1 wherein said webtop server is configured to acquire a proxy service, said proxy service configured to forward network messages between said client and a service executing on said application server.

5. The computing environment of claim 1 wherein said webtop server is configured to acquire a service from said application server tier in response to a request for said service.

6. The computing environment of claim 5 wherein said webtop server further comprises a service locator configured to identify a location of said service using a name of said service specified by said client.

7. A method of computing in a networked environment comprising:
   receiving at a local webtop server tier a request from a client tier;
   determining whether current version of information to satisfy said request is available from cache resident on said local webtop server;
   satisfying said request if said request can be satisfied by said local webtop server with current version of said information;
   performing the following if said request cannot be satisfied by said local webtop server:
      consulting a repository to determine a location of information to satisfy said request;
      acquiring said information from an application server identified by said location, said application server located in an application server tier, wherein said application server acquires said information from a database server in a database tier if said information is for stored data;
      saving said information returned from said application server in said local webtop server's cache for use to satisfy subsequent requests for said information; and
      satisfying, by said local webtop server, said request by said client, where in said local webtop server serves as host server tier for any application software requested by a client.

8. The method of claim 7 further comprising:
   a client in said client tier logging into said local webtop server; and said local webtop server maintaining login information for said client that can be used by said client to gain access to multiple applications.

9. The method of claim 8 further comprising:

said local webtop server generating a credential from said login information for said client, said credential including a signature for said local-webtop server;

said local webtop server submitting said credential to said application server; and said application server verifying said client by verifying said signature of said local webtop server and said credential of said client.

10. The method of claim 7 wherein said request is for application software.

11. The method of claim 7 wherein said request is for a service, said service is a servlet written in the Java programming language.

12. The method of claim 7 wherein said request is for application software, said application software is written in the Java programming language.

13. The method of claim 7 wherein said request is for service, said acquiring said information further comprising:

determining whether said service can be copied to said local webtop server;

acquiring a proxy to said service onto said local webtop server when said service cannot be copied to said local webtop server; and transmitting a handle to said proxy to said client, wherein said client may access said service-using said handle.

14. The method of claim 7 wherein said request is for a service, said acquiring said information further comprising:

determining whether said service can be copied to said local webtop server;

copying said service onto said local webtop server when said service can be copied to said local webtop server; and transmitting a handle to said service to said client, wherein said client may access said service using said handle.

15. The method of claim 7 wherein said local webtop server maintains a most recent version of said information cached on said local webtop server.

16. A computer program product comprising:

a computer readable medium having computer program code embodied therein for computing in a networked environment, said computer program code configured to cause a computer to:

receive at a local webtop server tier a request from a client tier;

determine by said local webtop server whether current version of information to satisfy said request is available from cache resident on said local webtop server;

execute the following if said request cannot be satisfied from said cache:

consult a repository to determine a location of information to satisfy said request;

acquire said information from an application server identified by said location, said application server located in an application server tier, wherein said application server acquires said information from a database server in a database tier if said information is for stored data;

save said information returned from said application server in said local webtop server's cache for use to satisfy subsequent requests for said information; and satisfy, by said local webtop server, said request by said client, wherein said-local webtop -server serves as host server tier for any application software requested by a client.

17. The computer program product of claim 16, further comprising computer program code configured to cause a computer to:

require a client to login into said local webtop server as a client of said local webtop server; and maintain login information by said local webtop server for said client that can be used by said client to gain access to multiple applications.

18. The computer program product of claim 17, further comprising computer program code configured to cause a computer to:

generate a credential from said login information for said client, said credential including a signature for said local webtop server;

submit said credential to said application server; and verify said client using said signature of said local webtop server and said credential of said client.

19. The computer program product of claim 16 wherein said acquire said information further comprises computer program code configured to cause a computer to:

determine whether said service can be copied to said local webtop server;

obtain a proxy to said service onto said local webtop server when said service cannot be copied to said local webtop server; and acquire said service onto said local webtop server when said service can be copied to said local webtop server.

* * * * *